(12) United States Patent
Fransen et al.

(10) Patent No.: US 12,354,149 B2
(45) Date of Patent: Jul. 8, 2025

(54) NAVIGATION AND REWARDS INVOLVING PHYSICAL GOODS AND SERVICES

(71) Applicant: Adobe Inc., San Jose, CA (US)

(72) Inventors: Peter Raymond Fransen, Soquel, CA (US); Matthew William Rozen, San Francisco, CA (US); Brian David Williams, San Jose, CA (US); Cory Lynn Edwards, Highland, UT (US)

(73) Assignee: Adobe Inc., San Jose, CA (US)

( * ) Notice: Subject to any disclaimer, the term of this patent is extended or adjusted under 35 U.S.C. 154(b) by 236 days.

(21) Appl. No.: 17/898,183

(22) Filed: Aug. 29, 2022

(65) Prior Publication Data

US 2022/0414742 A1 Dec. 29, 2022

Related U.S. Application Data

(63) Continuation of application No. 15/238,374, filed on Aug. 16, 2016, now Pat. No. 11,461,820.

(51) Int. Cl.
*G06Q 30/0601* (2023.01)

(52) U.S. Cl.
CPC ..... *G06Q 30/0631* (2013.01); *G06Q 30/0633* (2013.01); *G06Q 30/0639* (2013.01)

(58) Field of Classification Search
None
See application file for complete search history.

(56) References Cited

U.S. PATENT DOCUMENTS

| | | |
|---|---|---|
| 7,667,700 B1 | 2/2010 | Neely et al. |
| 7,893,935 B1 | 2/2011 | Neely et al. |
| 8,217,856 B1 | 7/2012 | Petrou |
| 8,303,387 B2 | 11/2012 | Spivack |
| 8,312,552 B1 | 11/2012 | Hadden et al. |
| 8,745,494 B2 | 6/2014 | Spivack |
| 8,799,810 B1 | 8/2014 | Wheeler |
| 8,825,081 B2 | 9/2014 | Arrasvuori et al. |
| 8,866,847 B2 | 10/2014 | Bedi et al. |
| 9,058,790 B2 | 6/2015 | Kato |
| 9,147,208 B1 | 9/2015 | Argue et al. |
| 9,390,459 B2 | 7/2016 | Tamir et al. |

(Continued)

OTHER PUBLICATIONS

"Advisory Action", U.S. Appl. No. 15/297,032, Aug. 1, 2018, 5 pages.

(Continued)

*Primary Examiner* — Michelle T Kringen
(74) *Attorney, Agent, or Firm* — FIG. 1 Patents

(57) ABSTRACT

Navigation and reward techniques involving physical goods and services are described. In one example, digital content is configured to aid navigation of a user between different physical goods or services. This navigation includes user specified good or services as well as recommended goods or services that are not specified by the user. In another example, digital content is provided as part of a reward system. In return for permitting access to user data, the user is provided with rewards that are based on this monitored interaction. In this way, an owner of the store may gain detailed knowledge which may be used to increase likelihood of offering goods or services of interest to the user. In return, the user is provided with rewards to permit access to this detailed knowledge.

20 Claims, 10 Drawing Sheets

(56) References Cited

U.S. PATENT DOCUMENTS

| | | |
|---|---|---|
| 9,495,614 B1 | 11/2016 | Boman et al. |
| 9,729,864 B2 | 8/2017 | Stafford |
| 10,068,378 B2 | 9/2018 | Cabanier et al. |
| 10,198,846 B2 | 2/2019 | Carr |
| 10,430,559 B2 | 10/2019 | Anantharaman |
| 10,506,221 B2 | 12/2019 | Kim |
| 10,521,967 B2 | 12/2019 | Cabanier et al. |
| 11,461,820 B2 | 10/2022 | Fransen et al. |
| 2003/0182256 A1 | 9/2003 | Otey |
| 2008/0004950 A1 | 1/2008 | Huang et al. |
| 2009/0037822 A1 | 2/2009 | Kandekar et al. |
| 2009/0048908 A1 | 2/2009 | Kaplan et al. |
| 2009/0087024 A1 | 4/2009 | Eaton et al. |
| 2009/0094518 A1 | 4/2009 | Lawther et al. |
| 2010/0082436 A1 | 4/2010 | Maghoul et al. |
| 2010/0226535 A1 | 9/2010 | Kimchi et al. |
| 2011/0258049 A1 | 10/2011 | Ramer et al. |
| 2011/0283223 A1 | 11/2011 | Vaittinen et al. |
| 2012/0030227 A1 | 2/2012 | Mital et al. |
| 2012/0140027 A1 | 6/2012 | Curtis et al. |
| 2012/0272179 A1 | 10/2012 | Stafford |
| 2013/0044912 A1 | 2/2013 | Kulkarni et al. |
| 2013/0050258 A1 | 2/2013 | Liu et al. |
| 2013/0236161 A1 | 9/2013 | Takeda |
| 2013/0258138 A1 | 10/2013 | Ma et al. |
| 2013/0307875 A1 | 11/2013 | Anderson |
| 2013/0326425 A1 | 12/2013 | Forstall et al. |
| 2014/0195968 A1 | 7/2014 | Banavara |
| 2014/0268356 A1 | 9/2014 | Bolas et al. |
| 2014/0279294 A1 | 9/2014 | Field-Darragh et al. |
| 2014/0333664 A1 | 11/2014 | Williams et al. |
| 2015/0058347 A1 | 2/2015 | Russek |
| 2015/0063661 A1 | 3/2015 | Lee et al. |
| 2015/0081604 A1 | 3/2015 | Duque et al. |
| 2015/0120648 A1 | 4/2015 | Slovacek |
| 2015/0193982 A1 | 7/2015 | Mihelich et al. |
| 2015/0213058 A1 | 7/2015 | Ambardekar et al. |
| 2015/0220802 A1 | 8/2015 | Mazur et al. |
| 2015/0227795 A1 | 8/2015 | Starner et al. |
| 2015/0227972 A1* | 8/2015 | Tang ................. G06Q 30/0255 705/14.53 |
| 2015/0234796 A1 | 8/2015 | Williams et al. |
| 2015/0243078 A1 | 8/2015 | Watson et al. |
| 2015/0254892 A1 | 9/2015 | Smith et al. |
| 2015/0278980 A1* | 10/2015 | Sinclair ................. G06T 1/0064 382/100 |
| 2015/0324698 A1 | 11/2015 | Karaoguz et al. |
| 2015/0348322 A1 | 12/2015 | Ligameri et al. |
| 2016/0026871 A1 | 1/2016 | Wexler et al. |
| 2016/0027214 A1 | 1/2016 | Memmott et al. |
| 2016/0055201 A1 | 2/2016 | Poupyrev et al. |
| 2016/0093105 A1 | 3/2016 | Rimon et al. |
| 2016/0112667 A1 | 4/2016 | Park et al. |
| 2016/0133052 A1 | 5/2016 | Choi et al. |
| 2016/0343107 A1 | 11/2016 | Newman et al. |
| 2016/0349845 A1 | 12/2016 | Poupyrev et al. |
| 2016/0364916 A1 | 12/2016 | Terahata |
| 2017/0026577 A1 | 1/2017 | You et al. |
| 2017/0039613 A1* | 2/2017 | Kaehler ............. G06Q 30/0643 |
| 2017/0061696 A1 | 3/2017 | Li et al. |
| 2017/0064374 A1 | 3/2017 | Eim et al. |
| 2017/0109794 A1 | 4/2017 | Smith et al. |
| 2017/0153698 A1 | 6/2017 | Bamidele et al. |
| 2017/0160815 A1 | 6/2017 | Glazier et al. |
| 2017/0163839 A1 | 6/2017 | Arana et al. |
| 2017/0201808 A1 | 7/2017 | Chowdhary et al. |
| 2017/0266554 A1 | 9/2017 | Marks et al. |
| 2017/0269685 A1 | 9/2017 | Marks et al. |
| 2017/0269713 A1 | 9/2017 | Marks et al. |
| 2017/0277256 A1 | 9/2017 | Burns et al. |
| 2017/0372401 A1 | 12/2017 | Wang et al. |
| 2018/0005443 A1 | 1/2018 | Poulos et al. |
| 2018/0039479 A1 | 2/2018 | Fransen et al. |
| 2018/0041750 A1 | 2/2018 | Kim |
| 2018/0046363 A1 | 2/2018 | Miller et al. |
| 2018/0053236 A1 | 2/2018 | Fransen et al. |
| 2018/0053333 A1 | 2/2018 | Carr |
| 2018/0059898 A1 | 3/2018 | Miller et al. |
| 2018/0061128 A1 | 3/2018 | Cabanier et al. |
| 2018/0075655 A1 | 3/2018 | Cabanier et al. |
| 2018/0107805 A1 | 4/2018 | Anantharaman |
| 2018/0330548 A1 | 11/2018 | Cabanier et al. |

OTHER PUBLICATIONS

"Augmented Reality & Visual Discovery Solutions | Blippar", Retrieved at: https://blippar.com/en/—on Aug. 22, 2016, 10 pages.

"Blippar: Augmented Reality App Turns Everyday Products into Interactive Experience", Business NewsDaily, https://www.businessnewsdaily.com/5627-blippar-app.html, Dec. 16, 2013, 3 pages.

"Corrected Notice of Allowability", U.S. Appl. No. 15/227,300, Nov. 7, 2019, 2 pages.

"Corrected Notice of Allowance", U.S. Appl. No. 15/262,616, May 8, 2018, 11 pages.

"Final Office Action", U.S. Appl. No. 15/243,130, Apr. 18, 2018, 14 pages.

"Final Office Action", U.S. Appl. No. 15/227,300, Nov. 30, 2018, 15 pages.

"Final Office Action", U.S. Appl. No. 15/297,032, Aug. 16, 2018, 17 pages.

"Final Office Action", U.S. Appl. No. 15/246,137, May 3, 2019, 23 pages.

"Final Office Action", U.S. Appl. No. 15/238,374, Jul. 24, 2020, 24 pages.

"Final Office Action", U.S. Appl. No. 15/246,137, Jul. 21, 2020, 25 pages.

"Final Office Action", U.S. Appl. No. 15/233,532, Nov. 1, 2018, 29 pages.

"Final Office Action", U.S. Appl. No. 15/233,532, Apr. 2, 2020, 30 pages.

"Final Office Action", U.S. Appl. No. 15/233,532, Sep. 14, 2021, 35 pages.

"Final Office Action", U.S. Appl. No. 15/238,374, Oct. 15, 2021, 40 pages.

"Final Office Action", U.S. Appl. No. 15/244,656, Sep. 21, 2017, 48 pages.

"Final Office Action", U.S. Appl. No. 15/228,680, Oct. 12, 2018, 52 pages.

"Final Office Action", U.S. Appl. No. 15/244,656, Jan. 28, 2019, 62 pages.

"Final Office Action", U.S. Appl. No. 15/228,680, Dec. 1, 2020, 78 pages.

"Final Office Action", U.S. Appl. No. 15/228,680, Dec. 5, 2019, 86 pages.

"First Action Interview Office Action", U.S. Appl. No. 15/228,680, Jul. 5, 2018, 11 pages.

"First Action Interview Office Action", U.S. Appl. No. 16/045,259, Sep. 4, 2019, 3 pages.

"First Action Interview Office Action", U.S. Appl. No. 15/262,616, Nov. 2, 2017, 3 pages.

"First Action Interview Office Action", U.S. Appl. No. 15/246,137, Dec. 6, 2018, 3 pages.

"First Action Interview Office Action", U.S. Appl. No. 15/238,374, Nov. 13, 2019, 30 pages.

"First Action Interview Office Action", U.S. Appl. No. 15/233,532, Aug. 28, 2018, 4 pages.

"First Action Interview Office Action", U.S. Appl. No. 15/227,300, Jun. 5, 2018, 5 pages.

"Non-Final Office Action", U.S. Appl. No. 15/227,300, Mar. 22, 2019, 12 pages.

"Non-Final Office Action", U.S. Appl. No. 15/297,032, Dec. 1, 2017, 17 pages.

"Non-Final Office Action", U.S. Appl. No. 15/246,137, Sep. 10, 2018, 20 pages.

"Non-Final Office Action", U.S. Appl. No. 15/238,374, May 13, 2021, 23 pages.

(56) References Cited

OTHER PUBLICATIONS

"Non-Final Office Action", U.S. Appl. No. 15/244,656, Jun. 14, 2017, 29 pages.
"Non-Final Office Action", U.S. Appl. No. 15/238,374, Sep. 6, 2019, 29 pages.
"Non-Final Office Action", U.S. Appl. No. 15/246,137, Oct. 4, 2019, 32 pages.
"Non-Final Office Action", U.S. Appl. No. 15/233,532, Apr. 16, 2021, 33 pages.
"Non-Final Office Action", U.S. Appl. No. 15/233,532, Aug. 8, 2019, 37 pages.
"Non-Final Office Action", U.S. Appl. No. 15/228,680, Jun. 11, 2019, 61 pages.
"Non-Final Office Action", U.S. Appl. No. 15/244,656, Jun. 28, 2018, 70 pages.
"Non-Final Office Action", U.S. Appl. No. 15/228,680, Jun. 22, 2020, 91 pages.
"Notice of Allowance", U.S. Appl. No. 15/243,130, Oct. 24, 2018, 13 pages.
"Notice of Allowance", U.S. Appl. No. 15/262,616, Apr. 27, 2018, 14 pages.
"Notice of Allowance", U.S. Appl. No. 15/297,032, May 22, 2019, 16 pages.
"Notice of Allowance", U.S. Appl. No. 15/227,300, Aug. 28, 2019, 5 pages.
"Notice of Allowance", U.S. Appl. No. 16/045,259, Sep. 17, 2019, 7 pages.
"PAVR Creates Emmy Award-Winning 360-Degree Video for FOX Sports", The Creative Cloud Team—Retrieved at: http://blogs.adobe.com/creativecloud/pavr-creates-emmy-award-winning-360-degree-video-for-fox-sports/, Jul. 13, 2016, 3 pages.
"Pre-Interview Communication", U.S. Appl. No. 15/228,680, May 17, 2018, 11 pages.
"Pre-Interview Communication", U.S. Appl. No. 15/243,130, Dec. 8, 2017, 16 pages.
"Pre-Interview Communication", U.S. Appl. No. 15/227,300, Feb. 5, 2018, 3 pages.
"Pre-Interview Communication", U.S. Appl. No. 15/262,616, Sep. 21, 2017, 3 pages.
"Preinterview First Office Action", U.S. Appl. No. 15/233,532, Jun. 1, 2018, 4 pages.
"Pre-Interview First Office Action", U.S. Appl. No. 16/045,259, Jul. 30, 2019, 3 pages.
"Pre-Interview First Office Action", U.S. Appl. No. 15/238,374, Sep. 16, 2019, 31 pages.
"Pre-Interview First Office Action", U.S. Appl. No. 15/246,137, Sep. 21, 2018, 5 pages.
"Restriction Requirement", U.S. Appl. No. 15/246,137, Jul. 20, 2018, 6 pages.
"Restriction Requirement", U.S. Appl. No. 15/238,374, filed May 24, 2019, 7 pages.
U.S. Appl. No. 15/238,374, "Notice of Allowance", May 26, 2022, 15 pages.
Chuang, Yung-Yu, "Animating Pictures with Stochastic Motion Textures", ACM Transactions on Graphics, vol. 24, No. 3, to appear, (Proceedings of ACM SIGGRAPH 2005, Jul. 2005, Los Angeles), Jul. 2005, 8 pages.
Conner-Simons, Adam et al., "Reach in and Touch Objects in Videos with Interactive Dynamic Video", Retrieved at: https://www.csail.mit.edu/reach_in_and_touch_objects_in_videos_with%20_interactive_dynamic_video, Aug. 2, 2016, 3 pages.
Dailey, Matthewn et al., "Empath: A Neural Network that Categorizes Facial Expressions", Journal of cognitive neuroscience 14.8, 2002, pp. 1158-1173.
Disclosed Anonymously, , "Storing Information Associated with User Interactions with a Good or Service", An IP.com Prior Art Database Technical Disclosure; IP.com No. IPCOM000182426D <https://ip.com/I PCOM/000182426>, Apr. 30, 2009, 33 pages.
Fei-Fei, Li et al., "A Bayesian Hierarchical Model for Learning Natural Scene Categories", Computer Vision and Pattern Recognition, 2005, 8 pages.
Lumb, David , "New MIT tech lets you mess with objects in pre-recorded video—Yes, they've already successfully tested it in 'Pokémon Go.'", Retrieved at: https://www.engadget.com/2016/08/03/new-mit-tech-lets-you-mess-with-objects-in-pre-recorded-video/, Aug. 3, 2016, 2 pages.

\* cited by examiner

NAVIGATION AND REWARDS INVOLVING PHYSICAL GOODS AND SERVICES

RELATED APPLICATIONS

This application is a continuation of and claims priority to U.S. patent application Ser. No. 15/238,374 filed Aug. 16, 2016, the disclosure of which is incorporated by reference herein in its entirety.

BACKGROUND

Conventional interaction with physical "bricks and mortar" stores may be frustrating to modern users. Part of this is due to limited interactions provided by these physical stores when compared with their online counterparts. A user of an online store, for instance, is typically able browse a multitude of goods or services in a short amount of time in an organized and readily understood fashion. The user, for instance, may perform searches, navigate through categories of items, and so forth to locate a particular good or service of interest and even locate goods or services of which the user was not previously aware.

The same user when confronted with a physical counterpart of this online store, however, is not provided with such an ability. Rather, the user is forced to physically move through the store to locate a good or service, even if the user is aware of what good or service is desired. Accordingly, expectations created as a result of user interaction with online stores may cause the user to forgo interaction with physical stores.

SUMMARY

Navigation and reward techniques involving physical goods and services are described. In one example, digital content is configured to aid navigation of a user between different physical goods or services. This navigation includes user specified good or services as well as recommended goods or services that are not specified by the user. This increases a likelihood of purchase by the user from the physical store of both the desired goods or services as well as the recommended goods or services.

In another example, digital content is provided as part of a reward system. In return for permitting access to user data, the user is provided with rewards. This may include offers involving purchase of the goods or services that are related to interactions described by the data. In this way, an owner of the store may gain detailed knowledge which may be used to increase likelihood of offering goods or services of interest to the user. In return, the user is provided with rewards to permit access to this detailed knowledge.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
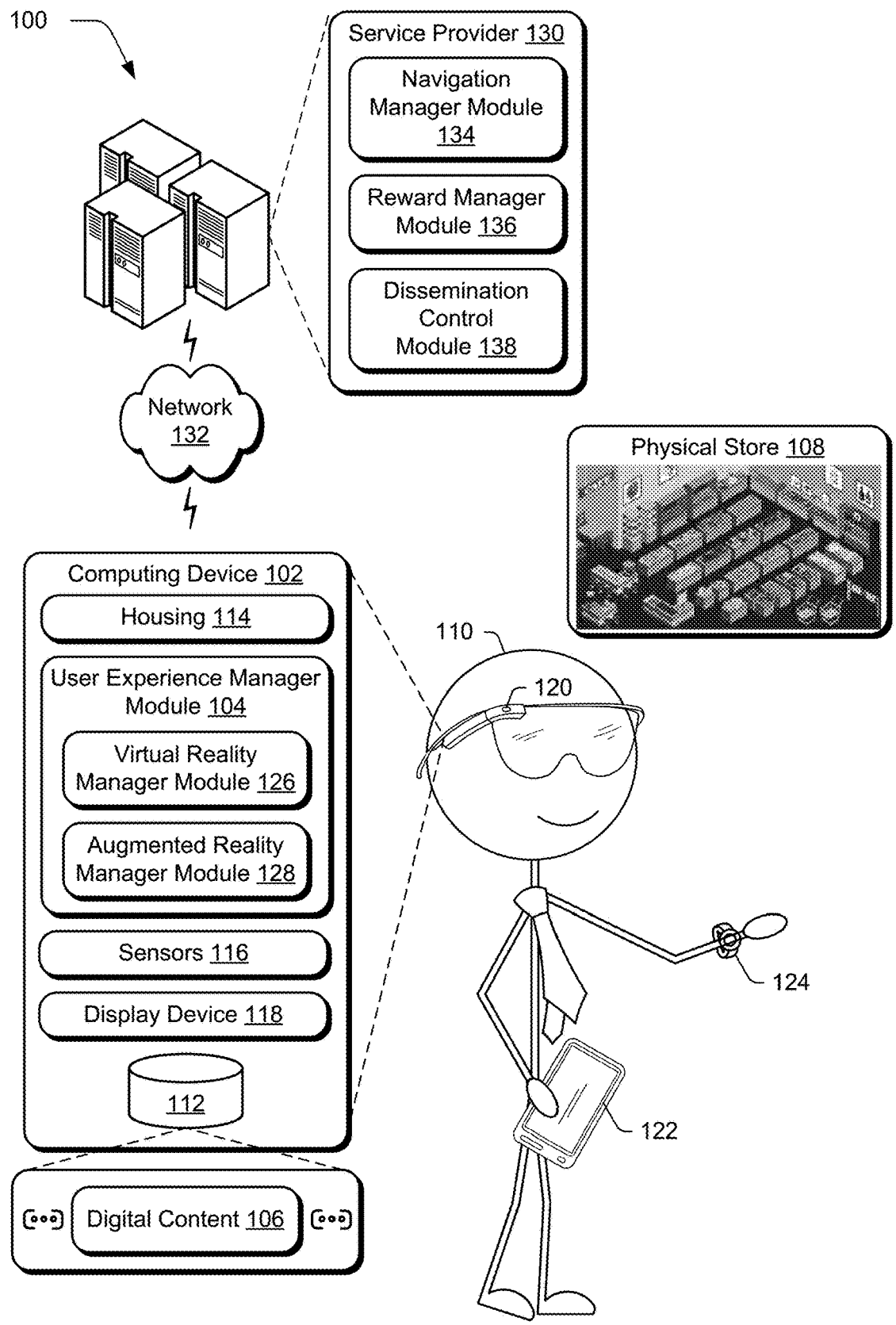
FIG. 1 is an illustration of an environment in an example implementation that is operable to employ techniques described herein.

Techniques and systems are described to support navigation and rewards as part of user interactions with physical goods and services. In one example, digital content is configured to aid navigation of a user between different physical goods or services. The user, for instance, may capture an image of a physical shopping list for physical goods or services. The image is then used to plot a physical path through a physical store that includes locations of the physical goods or services. The digital content that describes the path may then be used to guide the user through the store, such as through a map displayed by a display device of a mobile phone, virtual objects (e.g., arrows, floating signs, markers) as part of an augmented or virtual reality environment, and so forth.

As part of this, a recommendation is also formed for a physical good or service that is not part of the shopping list. The recommended physical good or service is also used as a basis to plot to physical path such that the user is also exposed to the good or service of the recommendation. In this way, a user is encouraged to provide this information (e.g., the shopping list) to increase efficiency in navigation of the physical store and is exposed to other goods or services that may also be of interest. This increases a likelihood of purchase by the user from the physical store of both the desired goods or services as well as the recommended goods or services. Thus, this is beneficial to both the user and an owner of the store. Further discussion of this example is described in the following in relation to FIGS. 2-5.

In another example, digital content is provided as part of a reward system. A physical store, for instance, may receive permission from a user to monitor the user's interaction with physical goods or services of the store. Continuing with the previous example, the user may download an application that supports navigation as described above. As part of an agreement to use this application, the user may permit data to be collected from a client device of the user, e.g., the user's mobile phone, headset, eyewear, and so forth, that describes the user interaction. This may include monitoring which items the user has picked up, gazed upon over a threshold amount of time, and so on.

In return for permitting access to this data, the user is provided with rewards that are based on this monitored interaction. This may include offers involving purchase of the goods or services that are related to the interactions, e.g., 20% off a food item that has been picked up by the user. The digital content, for instance, may be output as coupons on the user's phone when the user is disposed proximal to a respective good or service, displayed as a virtual object in an augmented or virtual reality scenario, and so forth. In this way, an owner of the store may gain detailed knowledge which may be used to increase likelihood of offering goods or services of interest to the user. In return, the user is provided with rewards to permit access to this detailed knowledge. Further discussion of this example is described in the following in relation to FIGS. 6-7.

In a further example, dissemination of digital content is controlled to supplement physical goods. This may include an ability expand a view of inventory, control branding, and so forth. For example, digital content may be specified by a shop owner to expand a user's view of inventory that is not currently available, e.g., on a shelf or from the store as a whole. This may also be used to brand a generic item used as corresponding a physical representation of a good to provide physical feedback to digital content that is viewed by a user. In another example, branding may be changed, such as to support seasonal labels to replace a default label for a physical good. In an "open shelf" example, additional inventory is displayed using virtual objects using open shelf space. Other examples are also contemplated, such as an in-aisle (e.g., "floating") display in an area proximal to a user. The user, for instance, may visit a soup section with competitive soups or crackers being displayed using virtual objects proximal to actual physical soups. Interaction with these virtual objects may be used to initiate fulfillment of a purchase of a represented item, e.g., "brought up from the back," fulfilled online and delivered to a user's home, a notification of where to locate the item in the physical store, and so on. Further discussion of these and other examples may be found in relation to FIGS. 8-9.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. The illustrated environment 100 includes a computing device 102 configured for use in augmented reality and/or virtual reality scenarios, which may be configured in a variety of ways.

Figure 10:
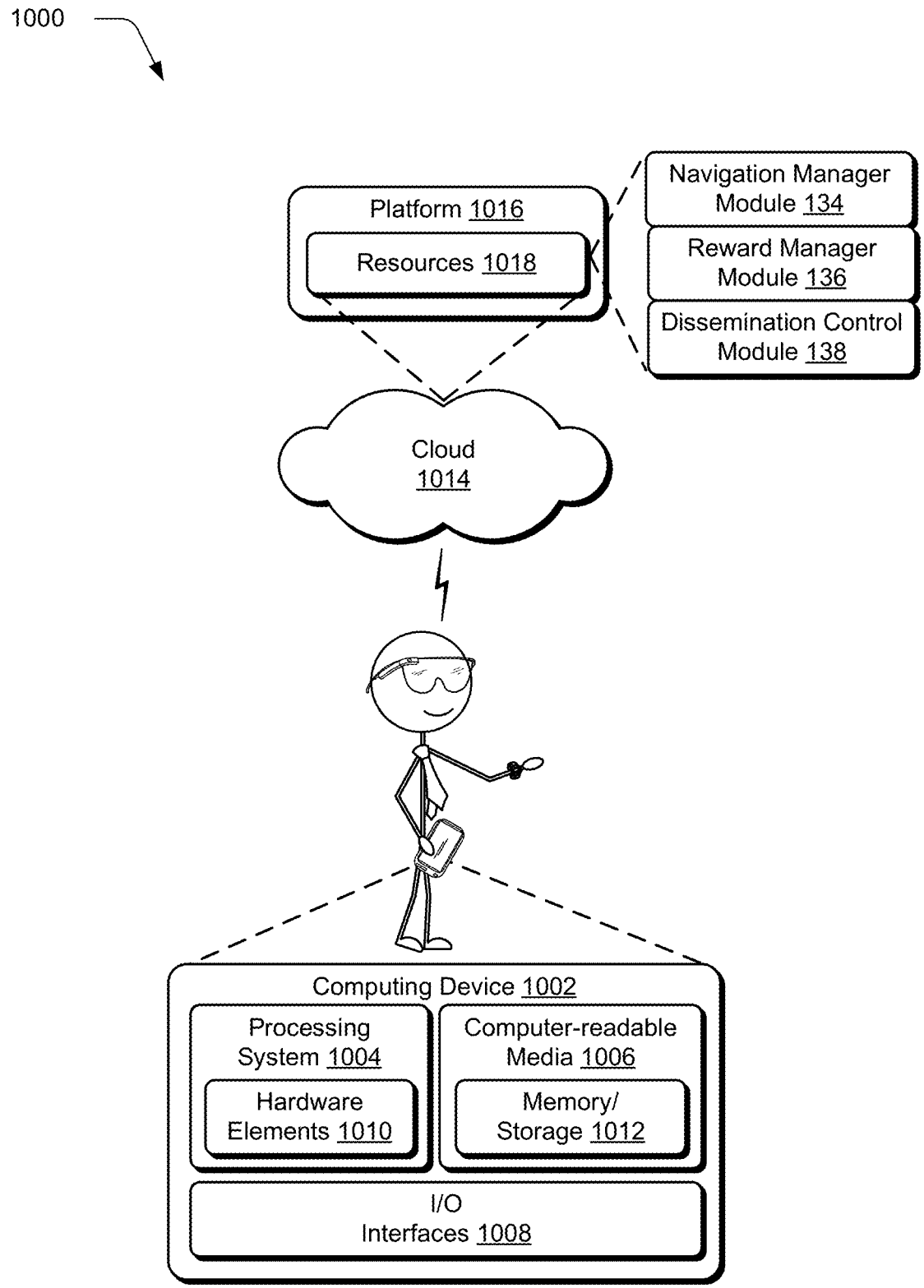
FIG. 10 illustrates an example system including various components of an example device that can be implemented as any type of computing device as described and/or utilize with reference to FIGS. 1-9 to implement embodiments of the techniques described herein.

The computing device 102 is illustrated as including a user experience manager module 104 that is implemented at least partially in hardware of the computing device 102, e.g., a processing system and memory of the computing device as further described in relation to FIG. 10. The user experience manager module 104 is configured to manage output of and user interaction with digital content 106 that is configured to aid interaction of the user 110 with a physical store 108. The digital content 106 is illustrated as maintained in storage 112 of the computing device 102 locally in this example and may also be available remotely via a network.

The computing device 102 includes a housing 114, one or more sensors 116, and a display device 118. The housing 114 is configurable in a variety of ways to support interaction with the digital content 106. In one example, the housing 114 is configured to be worn on the head of a user 110 (i.e., is "head mounted" 120), such as through configuration as goggles, glasses, contact lens, and so forth. In another example, the housing 114 assumes a hand-held 122 form factor, such as a mobile phone, tablet, portable gaming device, and so on. In yet another example, the housing 114 assumes a wearable 124 form factor that is configured to be worn by the user 110, such as a watch, broach, pendant, or ring. Other configurations are also contemplated, such as configurations in which the computing device 102 is disposed in a physical environment apart from the user 110, e.g., as a "smart mirror," wall-mounted projector, television, and so on.

The sensors 116 may also be configured in a variety of ways to detect a variety of different conditions. In one example, the sensors 116 are configured to detect an orientation of the computing device 102 in three dimensional space, such as through use of accelerometers, magnetometers, inertial devices, radar devices, and so forth. In another example, the sensors 116 are configured to detect environmental conditions of a physical environment in which the computing device 102 is disposed, such as objects, distances to the objects, motion, colors, and so forth. A variety of sensor configurations may be used, such as cameras, radar devices, light detection sensors (e.g., IR and UV sensors), time of flight cameras, structured light grid arrays, barometric pressure, altimeters, temperature gauges, compasses, geographic positioning systems (e.g., GPS), and so forth. In a further example, the sensors 116 are configured to detect environmental conditions involving the user 110, e.g., heart rate, temperature, movement, and other biometrics.

The display device 118 is also configurable in a variety of ways to support a virtual user experience. Examples of which include a typical display device found on a mobile device such as a camera or tablet computer, a light field display for use on a head mounted display in which a user may see through portions of the display, stereoscopic displays, projectors, television (e.g., a series of curved screens arranged in a semicircular fashion), and so forth. Other hardware components may also be included as part of the computing device 102, including devices configured to provide user feedback such as haptic responses, sounds, and so forth.

The housing 114, sensors 116, and display device 118 are also configurable to support different types of virtual user experiences by the user experience manager module 104. In one example, a virtual reality manager module 126 is employed to support virtual reality. In virtual reality, a user is exposed to an immersive environment, the viewable portions of which are entirely generated by the computing device 102. In other words, everything that is seen by the user 110 is rendered and displayed by the display device 118 through use of the virtual reality manager module 126 by rendering of the digital content 106.

The user, for instance, may be exposed to virtual objects as part of the digital content 106 that are not "really there" (e.g., virtual bricks) and are displayed for viewing by the user in an environment that also is completely computer generated. The computer-generated environment may also include representations of physical objects included in a physical environment of the user 110, e.g., a virtual table that is rendered for viewing by the user 110 to mimic an actual physical table in the environment detected using the sensors 116. On this virtual table, the virtual reality manager module 126 may also dispose virtual objects that are not physically located in the physical environment of the user 110, e.g., the virtual bricks as part of a virtual playset. In this way, although an entirely of the display being presented to the user 110 is computer generated, the virtual reality manager module 126 may represent physical objects as well as virtual objects within the display.

The user experience manager module 104 is also illustrated as supporting an augmented reality manager module 128. In augmented reality, the digital content 106 is used to augment a direct view of a physical environment of the user 110. The augmented reality manger module 128, for instance, may detect landmarks of the physical table disposed in the physical environment of the computing device 102 through use of the sensors 116, e.g., object recognition. Based on these landmarks, the augmented reality manager module 128 configures the digital content 106 to be viewed within this environment.

The user 110, for instance, may view the actual physical environment through head-mounted 120 goggles. The head-mounted 120 goggles do not recreate portions of the physical environment as virtual representations as in the VR scenario above, but rather permit the user 110 to directly view the physical environment without recreating the environment. The digital content 106 is then displayed by the display device 118 to appear as disposed within this physical environment. Thus, in augmented reality the digital content 106 augments what is "actually seen" by the user 110 in the physical environment. In the following discussion, the digital content 106 may be rendered by the user experience manager module 104 in both a virtual reality scenario and an augmented reality scenario.

The environment 100 is further illustrated as including a service provider 130 (e.g., a web service) that is communicatively coupled to the computing device 102 via a network 132. The service provider 130 is configured to generate the digital content 106 to aid the user 110 in interacting with the physical store 108. Although illustrated separately from the computing device 102, this functionality may also be implemented locally by the computing device 102, as part of an application, third-part plug-in module, and so forth.

A first example of this is represented using a navigation manager module 134. The navigation manager module 134 is configured at least partially in hardware to generate the digital content 106 to include a path to navigate through the physical store 108 to locate desired goods or services specified by the user 110. As part of formation of this digital content 106, the navigation manager module 134 also generates a recommendation of other goods or services that are not user specified. These other goods or services are also used to configure the physical path to take through the physical store 108 to include recommended goods or services that were not specified by the user.

The digital content 106, when configured to aid navigation, may be configured in a variety of ways. In a AR scenario, for instance, the digital content 106 may be displayed to augment a user's view of the physical store 108, e.g., through use of arrows displayed on the floor, a "floating" list of step-by-step instructions, markers indicating where various items are located, and so forth. The user may view this digital content through the head mounted 120 computing device, by holding up a handheld 122 or wearable 124 to act as a viewport that includes the digital content 106, and so forth. In a VR scenario, the physical store 108 is recreated to be viewed by the user including representations of physical objects in the store as well as the digital content 106. Other examples are also contemplated, such as a flat map shown on a mobile phone. Further discussion of operation of the navigation manager module 134 is included in a corresponding section in the following.

A second example is represented by a reward manager module 136. The reward manager 136 is implemented at least partially in hardware of a computing device to manage rewards provided to the user 110 in exchange for permitting data to be gathered from the computing device 102 of the user 110. The service provider 130, for instance, may make an application available for use by the user 110 when interacting with the physical store 108. The application, for instance, may be used to support the navigation techniques described above.

The user 110 may then "opt in" to allow the application to monitor user interaction with physical goods or services of the physical store 108. This monitoring may be performed in a variety of ways, such as through use of a camera, radar techniques, location based techniques, and so forth as part of the head mounted 120, handheld 122, or wearable 124 examples of the computing device 102. In return for permitting the gathering of this data, the reward manager module 136 calculates rewards that are exposed to the user 110 via digital content 106, e.g., towards purchase of goods or services from the physical store 108.

As above, the digital content 106 may be exposed to the user 110 in a variety of ways. In an AR scenario, for instance, the digital content 106 may be displayed to augment a user's view of the physical store 108, e.g., as a floating virtual coupon disposed near a respective good or service corresponding to the reward. The user may view this digital content through the head mounted 120 computing device, by holding up a handheld 122 or wearable 124 to act as a viewport that includes the digital content 106, and so forth. In a VR scenario, the physical store 108 is recreated to be viewed by the user including representations of physical objects in the store as well as the digital content 106. Other examples are also contemplated. Further discussion of operation of the navigation manager module 134 is included in a corresponding section in the following.

In yet another example, a dissemination control module 138 is used to control dissemination of the digital content 106 as associated with physical goods. This may be used to expand inventory or represent an inventory of physical goods. This may also be used to provide and change branding of the physical goods, further discussion of which is included in the corresponding section in the following.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Navigation of Physical Goods or Services

Figure 2:
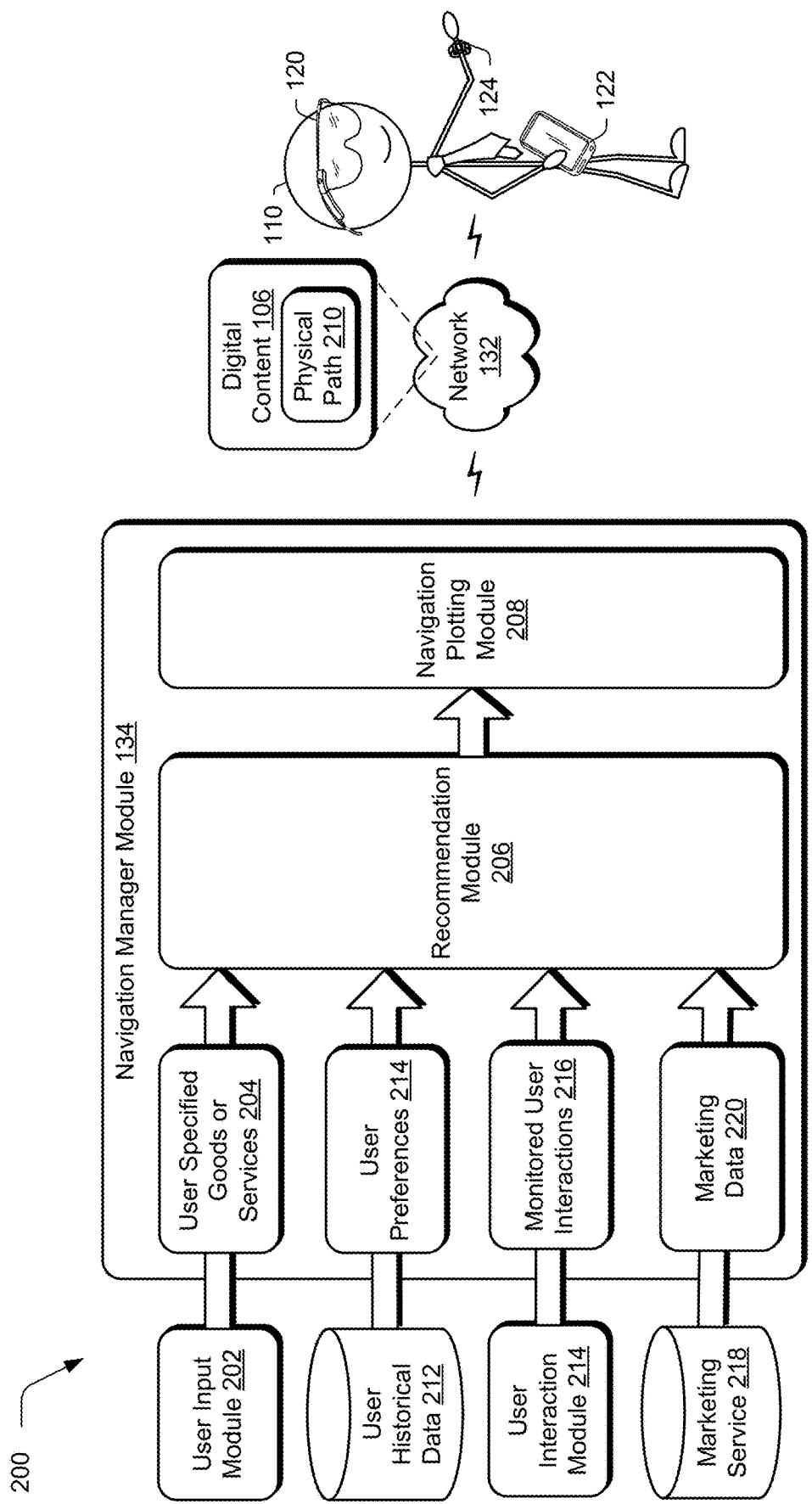
FIG. 2 depicts a system showing operation of a navigation manager module of FIG. 1 in greater detail.
Figure 3:
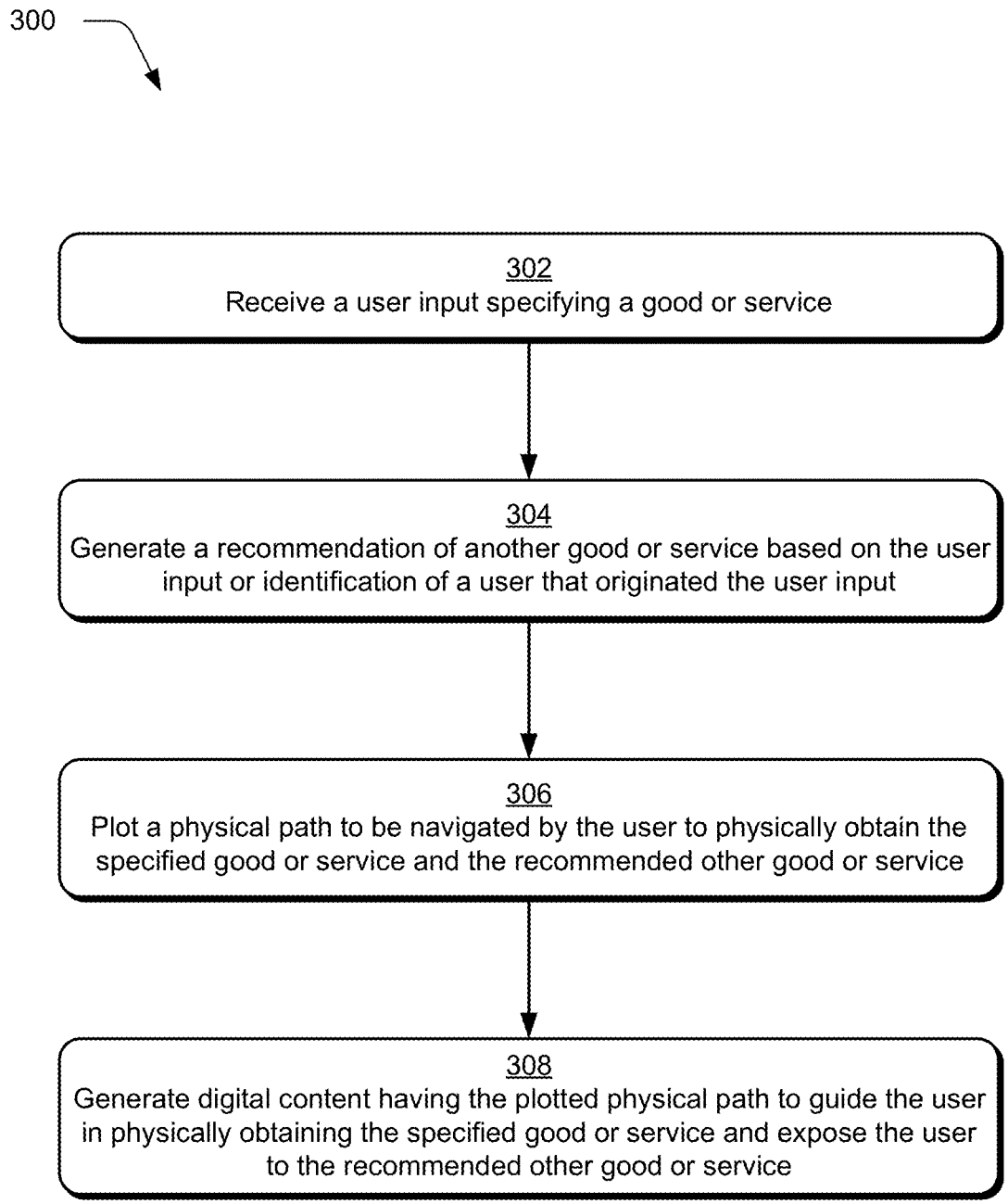
FIG. 3 is a flow diagram depicting a procedure in an example implementation in which digital content is generated that describes a physical path that includes navigation to a user specified good or service and a recommended good or service.
Figure 4:
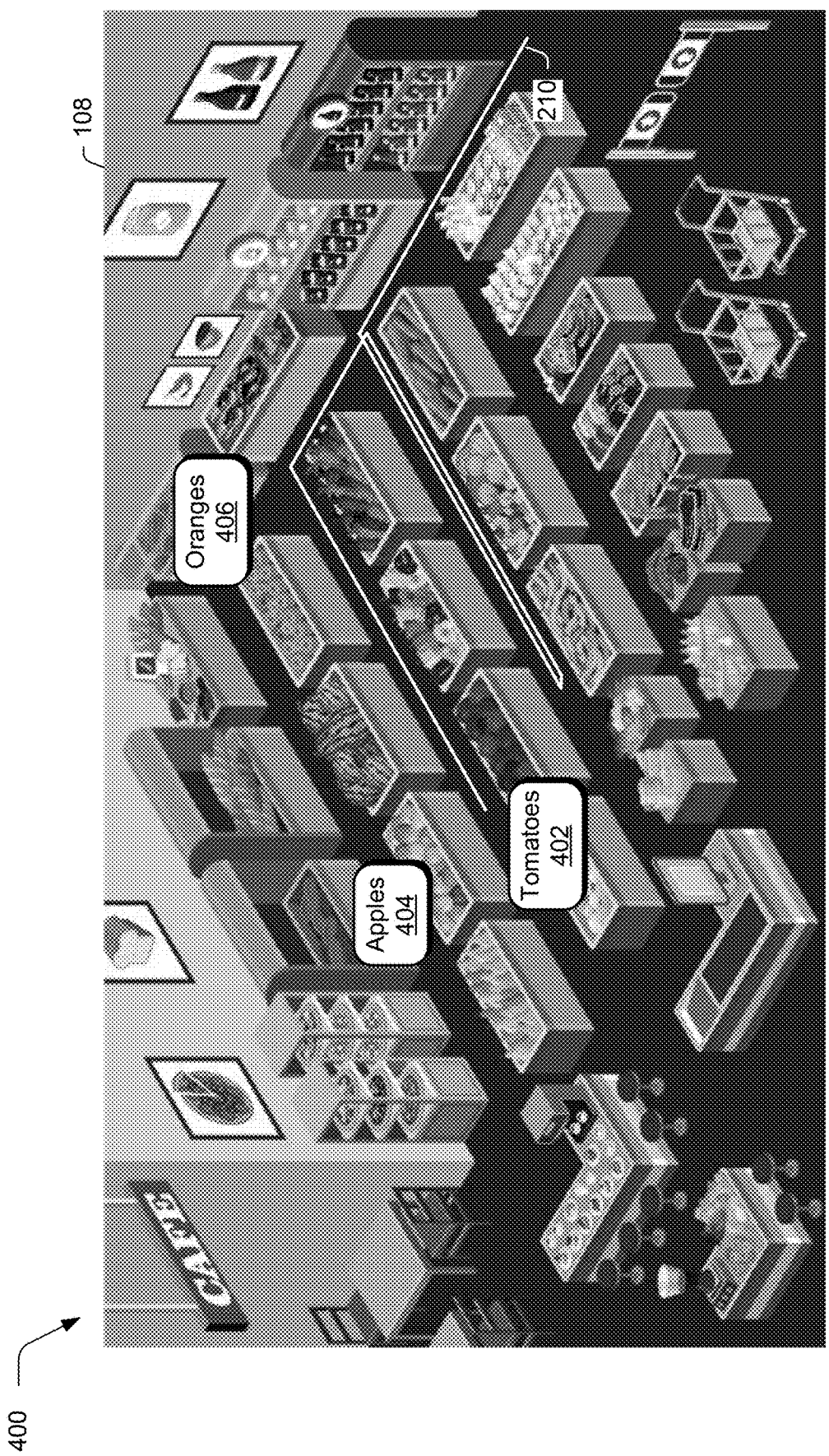
FIG. 4 depicts an example implementation of navigation of the physical store based on the digital content of FIG. 3.
Figure 5:
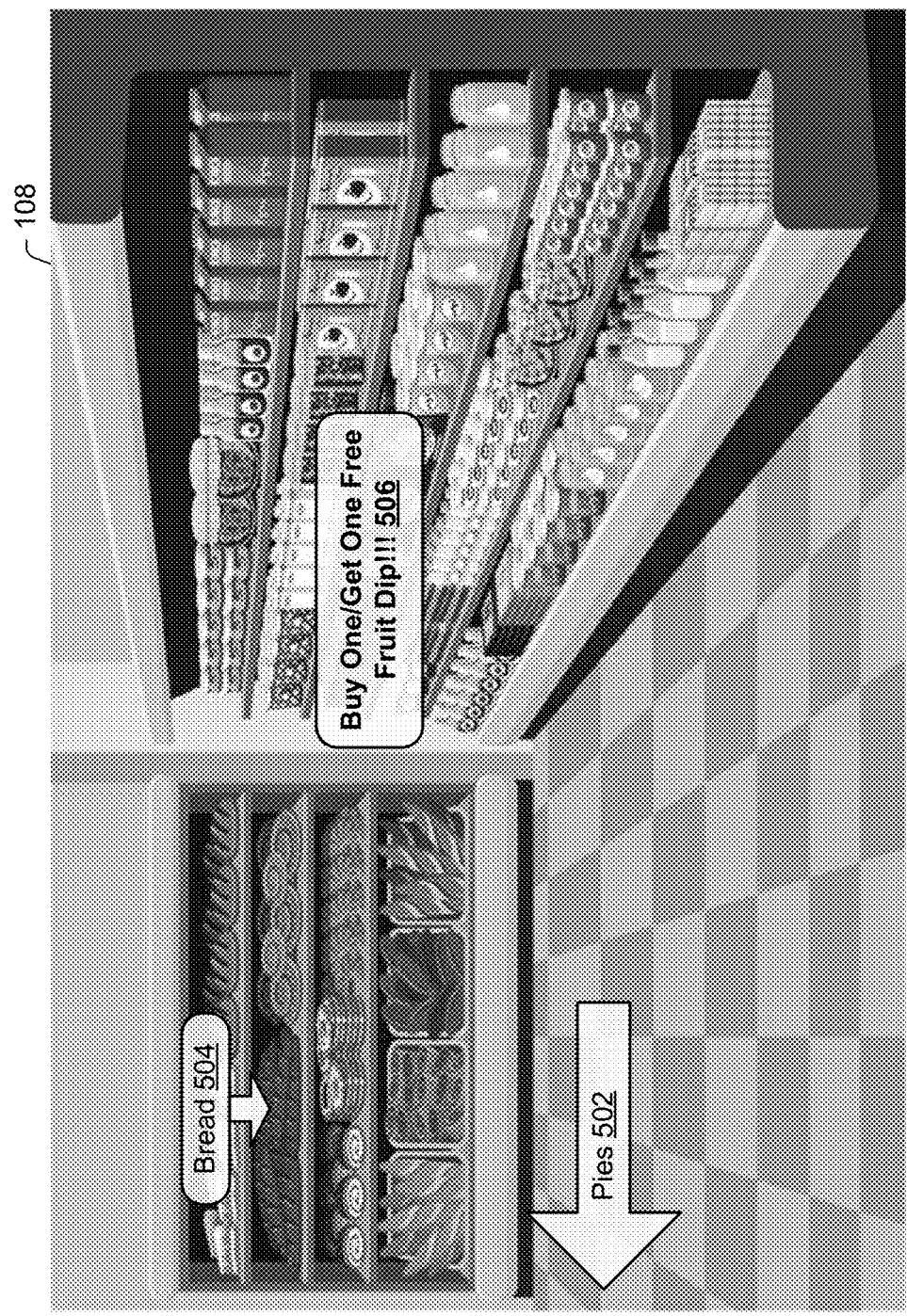
FIG. 5 depicts an example implementation of output of the digital content of FIG. 3 for viewing by a user.

FIG. 2 depicts a system 200 and FIG. 3 depicts a procedure 300 in an example implementation showing operation of the navigation manager module 134 in greater detail. FIG. 4 depicts an example implementation 400 of navigation of the physical store 108 based on the digital content 106. FIG. 5 depicts an example implementation of output of the digital content 106 for viewing by a user 110.

The following discussion describes techniques that may be implemented utilizing the described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference is made interchangeably to FIGS. 2-5.

To begin, a user input is received specifying a good or service (block 302). A user input module 202, for instance, may receive a listing of user specified goods or services 204. This may be performed by entering the list via a keyboard, a spoken utterance, text recognition from a digital image of a shopping list, and so forth.

A recommendation is then generated of another good or service based on the user input or identification of a user that originated the user input (block 304). A recommendation module 206, for instance, may be based on which good or services are specified by the user 110, such as to suggest a wine to pair with a particular combination of ingredients. In another instance, the recommendation module 206 may base this one characteristics of the user 110, such as demographics, past purchase history, and so forth as further described below.

A physical path is plotted to be navigated by the user to physically obtain the specified good or service and the recommended other good or service (block 306). A navigation plotting module 208, for instance, may examine a database to determination locations of the user specified goods or services 204 as well as recommended goods or services at a physical store 208. A physical path 210 is then plotted through these locations, which may be based on a variety of considerations including shortest distance, correspondence of different goods or services to each other (e.g., chips then soda), and so forth.

Digital content is generated having the plotted physical path to guide the user in physically obtaining the specified good or service and expose the user to the recommended other good or service (block 308). The digital content 106, for instance, may be configured for display by a display device of a head mounted 120 computing device, such as through use of eyewear in a virtual or augmented reality scenario as shown in FIG. 5.

In another example, the digital content 106 is configured for display by a handheld 122 or wearable 124 computing device 102. This may also support a virtual or augmented reality scenario in which the display device acts as a "portal" to view the physical path 210 of the digital content 106. In a further example, the digital content 106 is viewable as a "flat" or "perspective" map. A variety of other examples are also contemplated. In this way, a user is guided in navigation to user specified goods or services 204 in an efficient manner and is exposed to other recommended goods or services.

The recommendation module 206 may generate the recommendation of the other goods or services based on a variety of factors. In a first example, user historical data 212 is used to generate user preferences 214 regarding goods or services. The user historical data 212, for instance, may describe which items (i.e., goods or services) were previously purchased by the user 110, groups of items purchased together by the user 110, timing (including quantities and regularity) of these purchases, which items are returned, and so forth. From this, the recommendation module 206 may then determine similar items based on the user specified goods or services, identification of the user to determine which items are "due to be purchased" by the user 110, and so forth.

In a second example, a user interaction module 214 is implemented at least partially in hardware to monitor user interactions 216 with physical goods or services. From this, the recommendation module 206 determines which goods or services are likely of interest to the user and recommends related goods or services. The user 110, for instance, may physically pick up a package of hamburger, gaze at the package or a group of packages of hamburger over a threshold amount of time, and so forth. From this, the recommendation module 206 may recommend related goods or services, e.g., hamburger buns, paper plates, decorations (e.g., based on proximity to a holiday), ketchup based on user historical data 212 indicating the ketchup is likely to run out based on historical purchase frequency, and so forth.

In a third example, a marketing service 218 provides marketing data 220 to the recommendation module 206 to generate the recommendation. The marketing service 218, for instance, may collect marketing data 220 describing a plurality of users with the physical store 108 or other stores, purchase histories, and so on. In a first instance, a weighting is generated of an association of goods or services with each other based on past purchase behavior of the users. This weighting may then be used to rank available goods or service at the physical store 108 based on the user specified goods or services 204 in order to form the recommendation.

In another instance, at least one model is trained using machine learning to classify users into respective segments based on characteristics of the users (e.g., demographics) and characteristics of goods or services purchased by these users. Accordingly, characteristics of the user 110 and/or goods or services purchased by the user 110 may be processed to generate recommendations of other goods or services to be exposed to the user 110 based on the segment, to which, the user 110 belongs. For example, the model may be trained to classify the user to a particular demographic having a particular purchase history. From this, the recommendation module 206 may form the recommendation to include a good or service that has not yet been exposed to the user, has not been exposed within a threshold amount of time, and so forth. Other considerations may also be taken into account by the recommendation module 206, such as available price reductions of goods that are about to expire, an overabundance of particular goods at the physical store 108, increase awareness of items that "aren't selling," and so forth.

The navigation plotting module 208 may also be configured to take a variety of factors into account when plotting the physical path 210. An example of this is illustrated in the example implementation of FIG. 4. In this example, a user's shopping list includes tomatoes 402 and apples 404. Based on this, the recommendation module 206 also forms a recommendation of oranges 406, e.g., based on user historical data 212, monitored user interactions 216, marketing data 220, and so forth.

From this, the navigation plotting module 208 is able to determination locations of these goods within the physical store 108. The navigation plotting module 208 may then take a variety of considerations into account when plotting the physical path 210 through the store. For example, the user's shopping list includes exclusively fruits, and therefore the user is unlikely to be interested in meats. Accordingly, the path 210 is configured to expose the user 110 to the fruit isle, even in instances in which this might not be the shortest distance to the tomatoes 402.

The path 210 is also configured to expose the user 110 to the recommended oranges 406, e.g., have the user simply "walk by" the oranges 406, output digital content in an AR/VR scenario as shown in FIG. 5, and so on. This is done in this example even though this is not the shortest path from the tomatoes 402 to the apples 404 in the store 108. In this way, a user is efficiently navigated through the physical store 108, which may be daunting in conventional "big box" store examples (e.g., hardware or warehouse stores) and even smaller stores (e.g., pharmacies) in which it is difficult to locate desired goods or services without having previous knowledge of the premises. The digital content 106 specifying the physical path 210 and even the recommendation itself may be configured in a variety of ways, an example of which is described in relation to FIG. 5.

FIG. 5 depicts an example implementation 500 of a view of a user of the physical store 108 of FIG. 4 that includes digital content 106 specifying the physical path and identifies the recommendation. In this example, a "heads up" display is shown, such as if the user 110 was viewing the physical store through a head mounted computing device 102 or holding a handheld or wearable computing device 102 up such that it appears as if the user is "looking through" the display device 118.

Digital content 106 is configured to augment the user's 110 view of the physical store 108. In one example, the digital content 106 is configured to guide the user along the physical path, such as represent a direction 502 to a respective good or service (e.g., "pies") using an arrow to appear as disposed on a floor of the physical store 108. In this way, the direction 502 does not interfere with a user's view of other goods or services. In another example, the digital content 106 is configured as a digital signpost, e.g., to indicate a location 504 in the air of "bread." A variety of other techniques may also be used to indicate the physical path 210 as previously described.

As part of navigation through the physical path 210, the user may be exposed to a recommended good or service. This may include simply navigating the user proximal to a location, at which, the recommended good or service is available in a passive example. In an active example, the digital content 106 includes an indication of the recommended good or service. In the illustrated example, an indication 506 of "buy one/get one free fruit dip" is output that identifies the recommended good (e.g., fruit dip based on the user specified apples) and an offer, e.g., buy one get one free. In this way, the digital content 106 may be used to dynamically expand a user's interaction with the physical store 108 using rich digital content 106. A variety of other examples are also contemplated as previously described.

Digital Content Rewards Involving Physical Goods or Services

Figure 6:
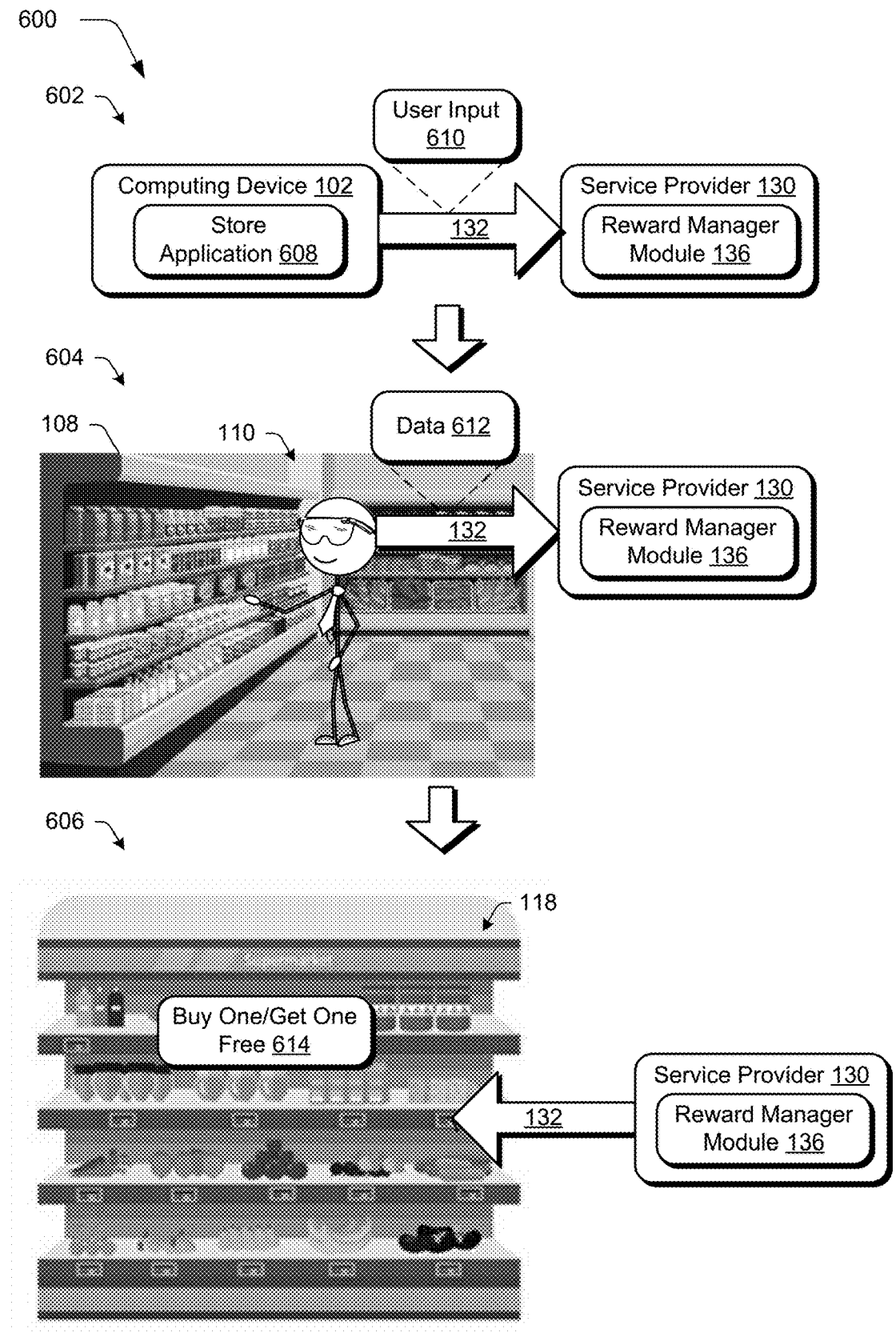
FIG. 6 depicts a system in an example implementation showing operation of the reward manager module in greater detail to generate digital content including the reward.
Figure 7:
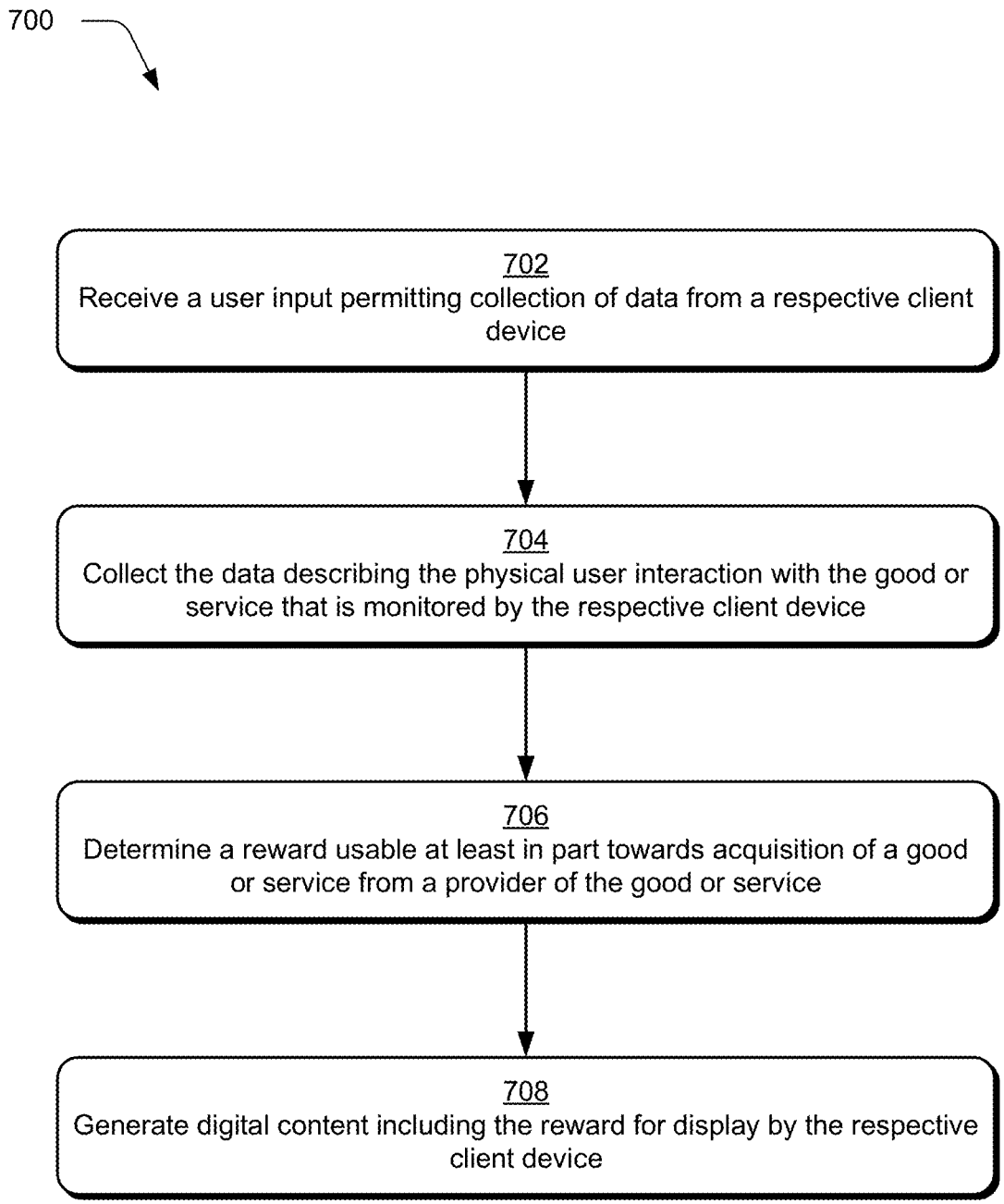
FIG. 7 is a flow diagram depicting a procedure in an example implementation showing operation of a reward manager module in greater detail as determining a reward from collected data describing physical user interaction with a good or service.

FIG. 6 depicts a system 600 and FIG. 7 depicts a procedure 700 in an example implementation showing operation of the reward manager module 136 in greater detail. The reward manager module 136 is configured to generate digital content having a reward that is provided in return for access to data collected that describes physical user interaction with goods or services. FIG. 6 is illustrated using first, second, and third stages 602, 604, 606.

The following discussion describes techniques that may be implemented utilizing the described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference is made interchangeably to FIGS. 6-7.

To begin, a user input is received to permit collection of data from a respective client device, the data describing the physical user interaction with the good or service that is monitored by the respective client device (block 702). As shown at the first stage 602, the user 110 interacts with a computing device 102 to download a store application 608, e.g., from the service provider 130, from an application store, and so forth. The computing device 102 is referred to as a client device in this example due to a client/server relationship with the service provider 130.

As part of interaction with the store application 608, the user 110 may provide a user input 610 that permits collection of data from the client device. The user 110, for instance, may "opt in" to terms and conditions of the store application 608, select an option to permit collection of this data, or use other techniques.

The data is collected that describes the physical user interaction with the good or service that is monitored by the respective client device (block 704). As shown at the second stage 604, the user 110 is disposed within the physical store 108. The user 110 then walks around the store and physically interacts with different goods or services of the store. A variety of different interactions maybe captured, such as gazing at an item or group of related items over a threshold amount of time, physically handling (e.g., picking up) one or more goods, and so forth. In this way, the data 612 may describe goods or services that may be of interest to the user.

The data 612 may also describe goods or services, in which, the user is not likely interested. This may be detected by monitoring which areas of the physical store 604 that user has not navigated through, goods or services in which the user has expressed disinterest (e.g., via spoken utterance such as "this is terrible"), and so forth. Detection of interest or disinterest may be implemented in a variety of ways, such as through use of a camera and object detection, radar techniques (e.g., Wi-Fi based), and so forth. In this way, a reward manager module 136 may gain access to a detailed data 612 describing user interactions. This data 612 may be leveraged for a variety of purposes such as marketing, control of placement of goods or services within the physical store 108, inventory control, and so forth.

In return for permitting collection of this data, a determination is made at the third stage 606 as to a reward 614 that is usable at least in part towards acquisition of a good or service from a provider of the good or service (block 706).

Digital content is then generated that includes the reward 614 for display by the respective client device (block 708). The reward manager module 136, for instance, may configure the reward 614 based on the data 612 that describes physical user interactions, such as to provide an ability to buy one/get one free 614 for a good the user has picked up, but then subsequently put down. The reward may also be based on a variety of other considerations, such as user historical data 212, or marketing data 220 as described in relation to FIG. 2, status of goods or services available at the physical store 108 (e.g., based on expirations dates, overstock), and so forth.

The reward 614 may be output for display as part of digital content 106 in a variety of ways, such as displayed on a user's phone when proximal to a respective good or service, as part of a user's 110 environment in an AR/VR scenario, and so on. In this way, the user 110 is encouraged to provide data 612 that may be leveraged by an owner of the physical store 108 and others (e.g., marketing service 218) and is provided with valuable rewards 614 in return.

Dissemination of Digital Content as Associated with a Physical Good

Figure 8:
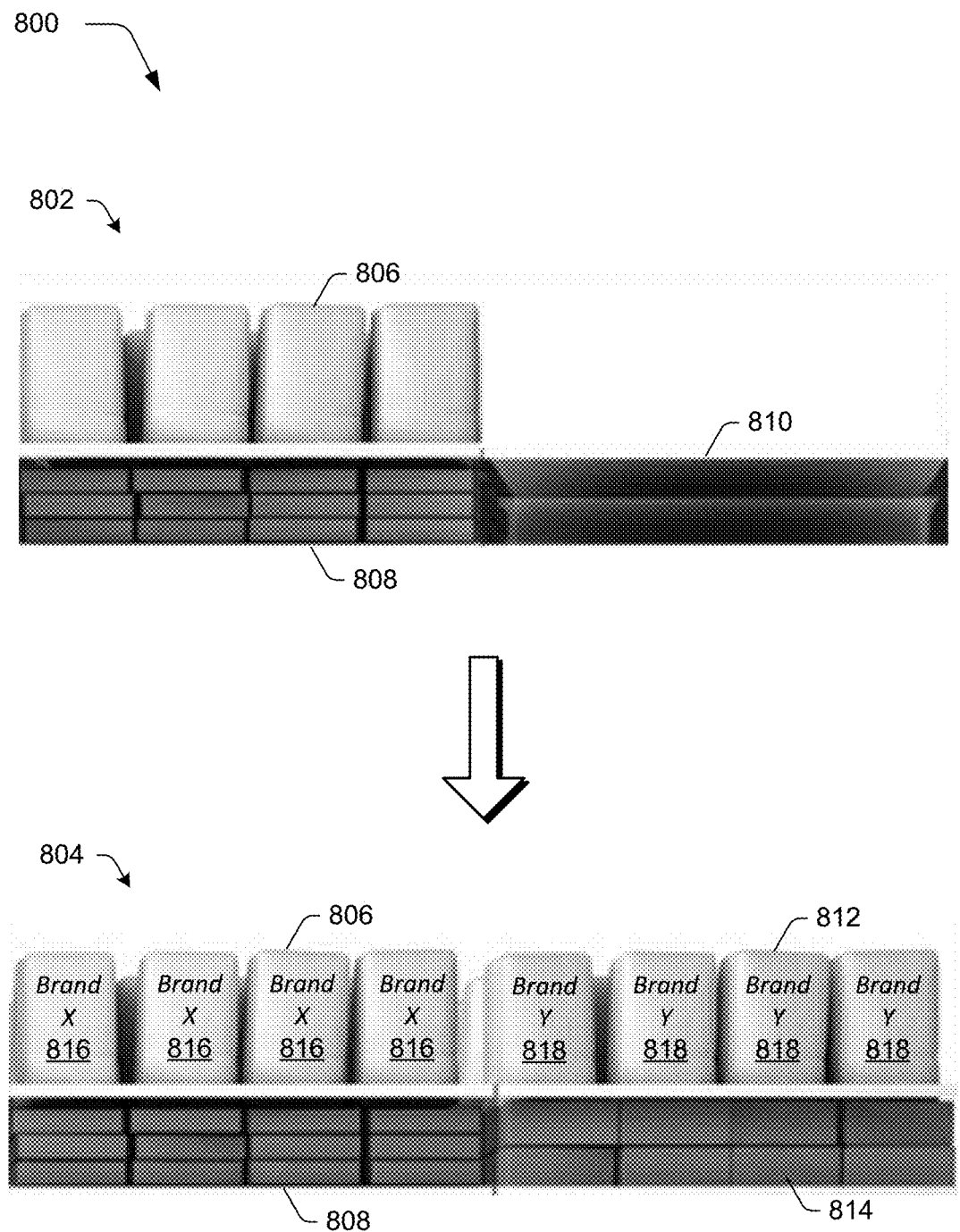
FIG. 8 depicts a system in an example implementation showing operation of a dissemination control module of FIG. 1 to output digital content to supplement a view of physical goods.
Figure 9:
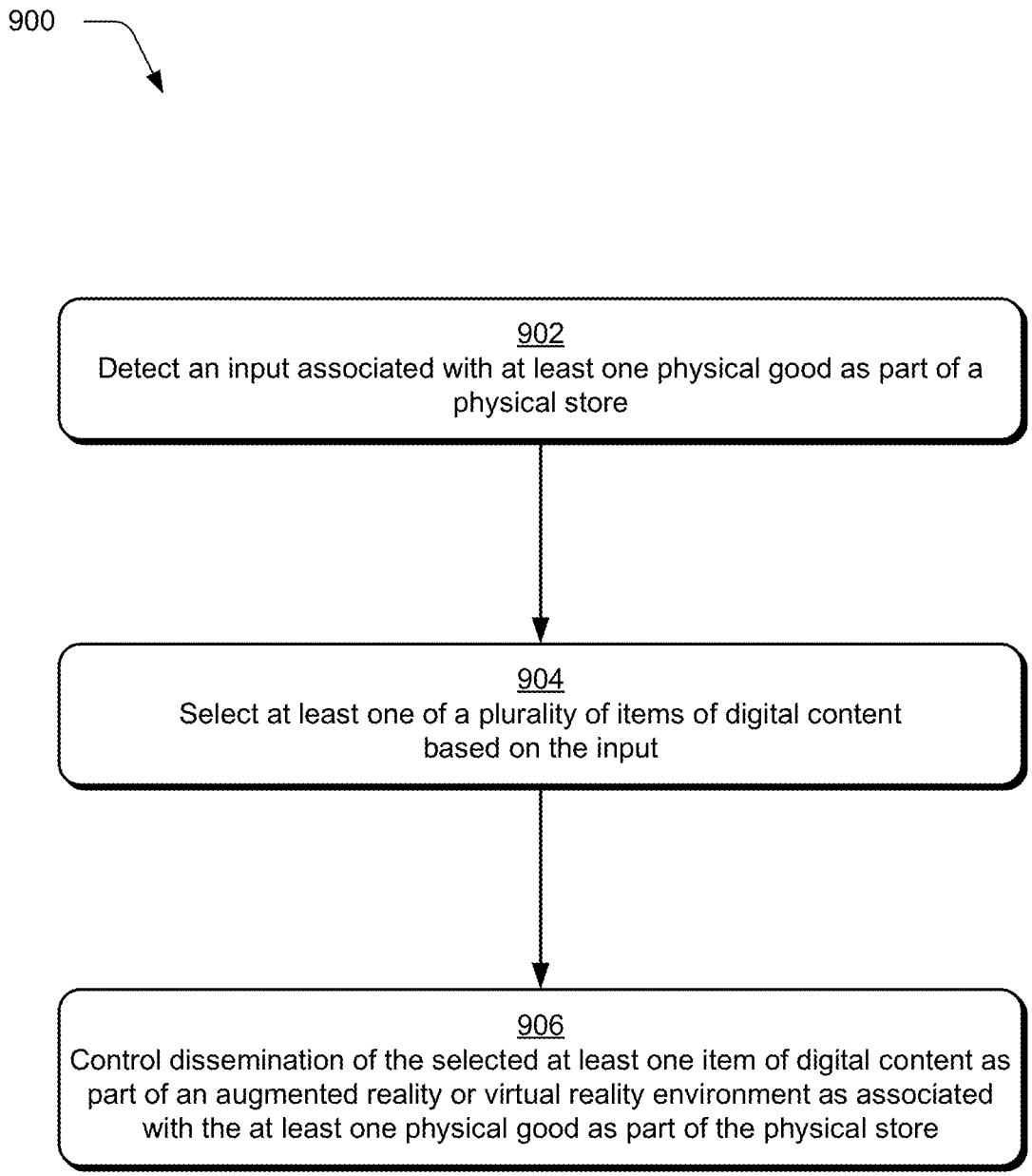
FIG. 9 is a flow diagram depicting a procedure in an example implementation in which dissemination of digital content is controlled, the digital content associated with a physical good.

FIG. 8 depicts a system 800 and FIG. 9 depicts a procedure 900 and in an example implementation showing operation of the dissemination control module 138 in greater detail. The dissemination control module 138 is configured to select digital content to supplement a view of physical goods, e.g., as part of a physical store. FIG. 8 is illustrated using first and second stages 802, 804.

The following discussion describes techniques that may be implemented utilizing the described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference is made interchangeably to FIGS. 8-9.

An input is detected that is associated with at least one physical good as part of a physical store (block 902). The input, for instance, may be detected using sensors 116 of the computing device 102. The input, for instance, may originate from a forward facing camera of the computing device 102 as worn or held by the user 110. In another instance, the input is received by the service provider 130, e.g., from a manager via a user interface. The manager of a physical store 108, for example, may specify digital content 106 for output to and viewing by the users 108. The input and subsequent digital content 106 output as a result may take a variety of forms as further described in the following.

At least one of a plurality of items of digital content are selected based on the input (block 904). Dissemination of the selected at least one item of digital content is then controlled as part of an augmented reality or virtual reality environment as associated with the at least one physical good as part of the physical store (block 906). This may support a variety of usage scenarios.

In a first such usage scenario example as shown at the first stage 902 of FIG. 8, physical goods 806, 808 are depicted as part of a physical store. An open shelf area 810 is also disposed next to these physical goods 806, 808, e.g., due to a lack of inventory. Accordingly, this lack of inventory may be detected by the computing device 102 (e.g., through object recognition) and cause selection and output of digital content 812, 814 representing physical goods that otherwise are to be disposed at that location.

In another example, the input originates at the service provider 130 (e.g., associated with the physical store) which then specifies the digital content 812, 814 to be selected to "fill" that open shelf area 810. A manager of the physical store 108, for instance, may specify digital content 86 that is to be used to "fill in" the open shelf area 810 to include inventory that otherwise would have been disposed at the open shelf area 810, rotate a display of different items of digital content representing different goods, leverage recommendations of FIG. 2, and so forth.

At the second stage 904, digital content 814, 816 is displayed that represents physical goods as part of a virtual reality or augmented reality environment. Continuing with the previous example, this may be triggered upon recognition of an open shelf area, based on location as specified by the service provider 130, and so forth. In this way, the digital content 106 may expand a user's 110 view of the physical goods to expand a view of inventory that otherwise may not be physically available.

In another example, the digital content is used to provide branding and even change existing branding available for the physical good. Again referring to the first stage 802, the physical goods 806 are generic in that the physical goods are not associated with any particular brand, but rather are used to provide physical feedback and haptics to a user 110 when being grasped and held.

Digital content 816 as shown at the second stage 804 is used to provide the branding to these goods. In which way, brand location may be efficient changed, moved between locations at the store (e.g., as part of the path techniques described above), and so forth.

Additionally, this may also be used to change/hide a physical brand (e.g., label) disposed on the physical goods through use of the digital content, such as from one brand to another, update of the label (e.g., for seasonal marketing campaigns), and so forth. For example, a provider of the physical good may provide digital content in order to change the label of the physical good for major holiday, include special offers (e.g., coupons), and so forth.

This may also be combined with display of associated good 821, 814, such as to provide digital content 818 that represents competitors that have goods that compete with the physical goods 806, 808 physically disposed in the store. The user 110, for instance, may view the physical goods 806 from Brand X. Digital content 818 displayed as part of an augmented or virtual reality scenario may be displayed for Brand Y next to these physical goods, such as in response to payment of a fee to an owner/operation of the physical store. In this way, the owner/operator may experience additional revenue opportunities which also benefits these other brands. For example, a bidding process may be supported via the service provider 130 in which marketers bid on opportunities to display digital content 106 within the physical store 108. The service provider 130 may then select from these opportunities and control dissemination of the digital content 106 to the computing device 102 of the user 110 as part of interaction with the physical store 108. A variety of other examples are also contemplated.

Example System and Device

FIG. 10 illustrates an example system generally at 1000 that includes an example computing device 1002 that is representative of one or more computing systems and/or devices that may implement the various techniques described herein. This is illustrated through inclusion of the navigation manager module 134, the reward manager module 136, and the dissemination control module 138. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interface 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1006 is illustrated as including memory/storage 1012. The memory/storage 1012 represents memory/storage capacity associated with one or more computer-readable media. The memory/storage component 1012 may include volatile media (such as random access memory (RAM)) and/or nonvolatile media (such as read only memory (ROM), Flash memory, optical disks, magnetic disks, and so forth). The memory/storage component 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through use of computer-readable storage media and/or hardware elements 1010 of the processing system 1004. The instructions and/or functions may be executable/operable by one or more articles of manufacture (for example, one or more computing devices 1002 and/or processing systems 1004) to implement techniques, modules, and examples described herein.

The techniques described herein may be supported by various configurations of the computing device 1002 and are not limited to the specific examples of the techniques described herein. This functionality may also be implemented all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 may include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 may abstract resources and functions to connect the computing device 1002 with other computing devices. The platform 1016 may also serve to abstract scaling of resources to provide a corresponding level of scale to encountered demand for the resources 1018 that are implemented via the platform 1016. Accordingly, in an interconnected device embodiment, implementation of functionality described herein may be distributed throughout the system 1000. For example, the functionality may be implemented in part on the computing device 1002 as well as via the platform 1016 that abstracts the functionality of the cloud 1014.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method, comprising:
    collecting, by a processing device, sensor data from one or more sensors of a client device associated with a user, the sensor data including a path taken by the client device through a physical store and describing a physical interaction of the user with a first good or service within the physical store;
    determining, by the processing device and based on the sensor data, a reward usable at least in part towards acquisition of a second good or service from a provider of the second good or service; and
    generating, by the processing device, digital content including the reward for display in a user interface of the client device and augmented reality or virtual reality content that plots a physical path through the physical store to obtain the second good or service associated with the reward.

2. The method as described in claim 1, further comprising receiving, by the processing device, a user input permitting collection of the sensor data from the client device, the sensor data describing the physical interaction with the first good or service and the path taken by the client device, the determining the reward performed responsive to receiving the user input.

3. The method as described in claim 1, wherein the sensor data describes the first good or service that is physically handled by the user.

4. The method as described in claim 1, wherein the reward involves a price reduction toward purchase of the second good or service from the provider or an offer to receive the second good or service by the user for free.

5. The method as described in claim 1, wherein the determining is based at least in part on:
    a quantity of physical user interactions with the first good or service; or
    a quantity of visits by the user to at least one physical location of the provider.

6. The method as described in claim 1, wherein the sensor data describes a user gaze towards the first good or service greater than a threshold amount of time.

7. The method as described in claim 1, wherein the sensor data describes a spoken utterance of the user indicating an interest in the first good or service.

8. A non-transitory computer-readable storage medium storing executable instructions, which when executed by a processing device, cause the processing device to perform operations comprising:
    collecting sensor data describing a physical interaction of a user with a good or service that is monitored by one or more sensors of a client device configured to detect physical touch;
    determining a reward usable at least in part towards acquisition of a particular good or service from a provider of the good or service based on the sensor data; and
    generating digital content including the reward for display in a user interface of the client device and augmented reality or virtual reality content that plots a physical path through a physical store associated with the provider to obtain the particular good or service associated with the reward.

9. The non-transitory computer-readable storage medium as described in claim 8, wherein the operations further comprise receiving a user input permitting collection of the sensor data from the client device.

10. The non-transitory computer-readable storage medium as described in claim 8, wherein the sensor data describes a path taken by the client device through the physical store.

11. The non-transitory computer-readable storage medium as described in claim 8, wherein the sensor data describes the good or service that is physically handled by the user.

12. The non-transitory computer-readable storage medium as described in claim 8, wherein the determining is based at least in part on:
    an amount of physical user interactions with the good or service; or
    an amount of visits by the user to at least one physical location of the provider of the good or service.

13. The non-transitory computer-readable storage medium as described in claim 8, wherein the sensor data describes a user gaze towards the good or service greater than a threshold amount of time.

14. The non-transitory computer-readable storage medium as described in claim 8, wherein the sensor data describes a spoken utterance of the user indicating an interest in the good or service.

15. The non-transitory computer-readable storage medium as described in claim 8, wherein the sensor data further includes a path taken by the client device through the physical store.

16. A system comprising:
a memory component; and
a processing device coupled to the memory component, the processing device to perform operations comprising:
collecting sensor data from one or more sensors of the processing device configured to detect physical touch, the sensor data describing a physical interaction of a user with a good or service within a physical store;
generating a weighting of an association between the good or service and a plurality of additional goods or services at the physical store based in part on a past purchase behavior of the user;
determining a reward usable at least in part towards acquisition of a particular good or service of the plurality of additional goods or services from a provider of the particular good or service based on the sensor data and the weighting; and
generating digital content including the reward for display in a user interface of the processing device.

17. The system as described in claim 16, wherein the past purchase behavior of the user indicates a quantity and regularity of purchases made by the user.

18. The system as described in claim 16, wherein the reward is further based on a status of available goods or services from the provider.

19. The system as described in claim 16, wherein the weighting is used to generate a ranking of the plurality of additional goods or services based on a similarity to the good or service, and the determining the reward is based in part on the ranking.

20. The system as described in claim 16, wherein the weighting is based in part on a likelihood of purchase of the good or service with one or more of the plurality of additional goods or services.

* * * * *